(12) United States Patent
Tanaka

(10) Patent No.: US 9,933,765 B2
(45) Date of Patent: Apr. 3, 2018

(54) CONTROL DEVICE AND CONTROL METHOD

(71) Applicant: Azbil Corporation, Tokyo (JP)

(72) Inventor: Masato Tanaka, Tokyo (JP)

(73) Assignee: Azbil Corporation, Tokyo (JP)

( * ) Notice: Subject to any disclaimer, the term of this patent is extended or adjusted under 35 U.S.C. 154(b) by 200 days.

(21) Appl. No.: 14/869,197

(22) Filed: Sep. 29, 2015

(65) Prior Publication Data
US 2016/0091880 A1    Mar. 31, 2016

(30) Foreign Application Priority Data
Sep. 29, 2014    (JP) .................................. 2014-197914

(51) Int. Cl.
G05B 15/02    (2006.01)
G05B 11/36    (2006.01)
G05D 23/19    (2006.01)

(52) U.S. Cl.
CPC .............. *G05B 15/02* (2013.01); *G05B 11/36* (2013.01); *G05D 23/1919* (2013.01)

(58) Field of Classification Search
None
See application file for complete search history.

(56) References Cited

U.S. PATENT DOCUMENTS

| 5,504,692 A * | 4/1996 | Cardner ................ G01F 15/068 |
| | | 700/266 |
| 6,898,943 B2 | 5/2005 | Tanaka |
| 7,449,113 B2 * | 11/2008 | Jenkins ................... C02F 3/006 |
| | | 210/143 |
| 7,718,066 B2 * | 5/2010 | Jenkins ................... C02F 3/006 |
| | | 210/143 |

(Continued)

FOREIGN PATENT DOCUMENTS

| CN | 1449480 C | 10/2003 |
| CN | 1181299 C | 12/2004 |

(Continued)

OTHER PUBLICATIONS

Japanese Application No. 2014-197914 , filed Sep. 29, 2014.

(Continued)

*Primary Examiner* — Ronald Hartman, Jr.
(74) *Attorney, Agent, or Firm* — Amster, Rothstein & Ebenstein LLP

(57) ABSTRACT

A control device includes a primary control unit which computes a manipulated variable and outputs it to an actuator of the primary control system; a secondary control unit which takes as input an equilibrium point setpoint representing an equilibrium point which is the desired manipulated variable output in steady state of primary control, takes the manipulated variable of the primary control system as process variable input, computes an adjusted manipulated variable, and outputs it to an actuator of the secondary (Continued)

control system; and an equilibrium point setpoint determination functional unit which detects a state in which the setpoint of the primary control system is maintained at the same value for a pre-specified period of time or longer as a steady state, computes an equilibrium point, and sets this equilibrium point setpoint in the secondary control unit.

10 Claims, 4 Drawing Sheets

(56) References Cited

U.S. PATENT DOCUMENTS

| | | | | |
|---|---|---|---|---|
| 8,478,444 B2* | 7/2013 | Fuxman | ................. | C12M 41/48 |
| | | | | 422/50 |
| 9,199,860 B2* | 12/2015 | MacArthur | ............ | G05B 17/02 |
| 9,594,365 B2 | 3/2017 | Tanaka | | |
| 2004/0112829 A1* | 6/2004 | Jenkins | ................... | C02F 3/006 |
| | | | | 210/614 |
| 2004/0112973 A1 | 6/2004 | Tanaka | | |
| 2011/0093247 A1* | 4/2011 | Beauregard | ............ | G05B 17/02 |
| | | | | 703/2 |
| 2012/0323342 A1* | 12/2012 | MacArthur | ............ | G05B 17/02 |
| | | | | 700/29 |
| 2014/0025210 A1* | 1/2014 | Joshi | .................... | G05B 13/042 |
| | | | | 700/282 |
| 2015/0185716 A1* | 7/2015 | Wichmann | ............ | F01K 23/101 |
| | | | | 700/287 |
| 2016/0281607 A1* | 9/2016 | Asati | ......................... | F02C 9/28 |

FOREIGN PATENT DOCUMENTS

| | | |
|---|---|---|
| CN | 103970083 B | 8/2016 |
| JP | 2002048378 A | 2/2002 |
| JP | 3805957 B2 | 5/2006 |
| KR | 20030022880 A | 3/2003 |
| KR | 100508852 B1 | 8/2005 |
| WO | 02/12798 A1 | 2/2002 |

OTHER PUBLICATIONS

State Intellectual Property Office of the P. R. C, "Office Action," issued in CN Patent Application No. 201510616507.4 which is a Chinese counterpart of U.S. Appl. No. 14/869,197, dated Sep. 28, 2017, 4 pages.

* cited by examiner

CONTROL DEVICE AND CONTROL METHOD

CROSS-REFERENCE TO RELATED APPLICATION

This application claims the benefit of and priority to Japanese Patent Application No. 2014-197914, filed on Sep. 29, 2014, the entire contents of which are incorporated by reference herein.

FIELD OF INDUSTRIAL USE

The present invention relates to a control device and control method which make it possible to implement energy conservation by determining the equilibrium point by an objective method in a control system having a configuration wherein, to a primary control system for the primary purpose of control, there is an added secondary control system for adjusting the equilibrium point, which is the desired manipulated variable output in a steady state of the primary control.

PRIOR ART

In a process control system for controlling process variables such as temperature and pressure, for example, if the object of control is temperature, there would be one each of a heater, temperature sensor and temperature controller. It is basic to have the combination of one actuator for one process variable PV.

On the other hand, methods of controlling temperature have also been proposed wherein two actuators, a heating actuator (heater) and cooling actuator (cooler) are operated in coordination (see Patent Literature 1). FIG. 6 is a drawing illustrating an example in which the control device disclosed in Patent Literature 1 has been applied to temperature control of a heat treatment oven, and FIG. 7 is a block diagram illustrating the configuration of the control device disclosed in Patent Literature 1. Heat treatment furnace 100 is configured to circulate air which is heated by heater 101 and cooled by cooler 102.

Controller 104 computes the manipulated variable for heating MV_A through PID control calculations based on process variable (temperature measurement value) PV_A and setpoint SP_A measured by temperature sensor 103. Controller 105 takes the desired value of the manipulated variable for heating MV_A of controller 104 as setpoint SP_B, takes the manipulated variable for heating MV_A of controller 104 as the process variable, and computes the manipulated variable for cooling MV_B through PID control calculations.

According to the technology disclosed in Patent Literature 1, it is possible not only to simply control the temperature but to also improve energy efficiency by reducing the mutual cancellation between heating and cooling. The distinguishing feature of the technology disclosed in Patent Literature 1 is that it focuses on the equilibrium point between heater output and cooler output, which is a factor affecting energy efficiency, and adds a control loop which constantly monitors and adjusts the heater output (manipulated variable MV_A).

CITATION LIST

Patent Literature

[Patent Literature 1] Japanese Patent No. 3805957

SUMMARY OF THE INVENTION

Problem to be Solved by the Invention

The desired equilibrium point setpoint (SP_B in FIG. 7) is set arbitrarily by the operator on site, and may substantially deviate from the proper balance point according to the operator's level of knowledge. In any case, the equilibrium point setpoint is determined subjectively, so the objectivity will not necessarily be maintained in the target state of the control system.

Even if the equilibrium point setpoint arbitrarily set by the operator should be deviate from the proper equilibrium point, technically, this will not be a major problem that would make the operation of the control system impossible. However, in a precooling-reheating type temperature control system, as disclosed in Patent Literature 1, mutual cancellation of outputs occurs, whereby the optimal temperature is achieved by first precooling with the cooler and then heating with the heater, and thus there is the problem that energy consumption will increase if this mutual cancellation of outputs is performed improperly.

In the technology disclosed in Patent Literature 1, energy conservation is implemented by minimizing the mutual cancellation of outputs as described above by having the operator arbitrarily choose the equilibrium point, and thus further improvement is sought as to the method of determining the equilibrium point setpoint. It will be noted that implementing an objective method of determining the equilibrium point setpoint is not limited to temperature control systems such as that disclosed in Patent Literature 1 and is a common problem for control systems with a configuration wherein a secondary control system for adjusting the equilibrium point is added to a primary control system for the primary purpose of control.

The present invention was made to resolve the aforesaid problem, its object being to provide a control device and control method which make it possible to implement energy conservation by determining the equilibrium point by an objective method in a control system having a configuration wherein a secondary control system for adjusting the equilibrium point is added to a primary control system for the primary purpose of control.

Means for Solving the Problem

The control device of the present invention is characterized in that it comprises: a first control calculation means which is provided in correspondence with a primary control system, takes a setpoint and process variable of said primary control system as input, and computes a first manipulated variable through control calculations; a first manipulated variable output means which outputs the first manipulated variable computed by the first control calculation means to an actuator of said primary control system; a second control calculation means which is provided in correspondence with a secondary control system for adjusting an equilibrium point, which is the desired manipulated variable output in a steady state of primary control, which means takes an equilibrium point setpoint representing said equilibrium point as input, takes the first manipulated variable computed by said first control calculation means as process variable input, and computes a second manipulated variable through control calculations; a second manipulated variable output means which outputs the second manipulated variable computed by the second control calculation means to an actuator of said secondary control system; a steady state detection means which detects, as steady state, a state in which the setpoint of said primary control system is maintained at the same value for a pre-specified period of time or longer; an equilibrium point setpoint determination means which computes said equilibrium point setpoint based on the difference between the average value and minimum value of said first manipulated variable or the difference between said average value and the maximum value of said first manipulated variable detected in said steady state; and an equilibrium point setpoint output means which sets the equilibrium point setpoint computed by the equilibrium point setpoint determination means as a value to be used by said second control calculation means.

Furthermore, one example of the configuration of the control device of the present invention is characterized in that said equilibrium point setpoint determination means performs upper/lower limit processing to constrain the computed equilibrium point setpoint to within the range between a predetermined upper limit value and lower limit value and outputs an equilibrium point setpoint which has been subjected to upper/lower limit processing to said equilibrium point setpoint output means; and the upper limit value of said equilibrium point setpoint is set to be smaller than a predetermined upper limit value of said first manipulated variable and the lower limit value of said equilibrium point setpoint is set to be greater than a predetermined lower limit value of said first manipulated variable.

Furthermore, one example of the configuration of the control device of the present invention is characterized in that the object of control manipulated by said primary control system and secondary control system can be maintained in a state more advantageous for energy conservation the smaller said first manipulated variable is; and said equilibrium point setpoint determination means computes said equilibrium point setpoint by adding, to the lower limit value of said first manipulated variable, a value obtained by including a margin in the difference between the mean value and minimum value of said first manipulated variable detected in said steady state.

Furthermore, one example of the configuration of the control device of the present invention is characterized in that the object of control manipulated by said primary control system and secondary control system can be maintained in a state more advantageous for energy conservation the greater said first manipulated variable is; and said equilibrium point setpoint determination means computes said equilibrium point setpoint by subtracting, from the upper limit value of said first manipulated variable, a value obtained by including a margin in the difference between said mean value and the maximum value of said first manipulated variable detected in said steady state.

Furthermore, one example of the configuration of the control device of the present invention is characterized in that said equilibrium point setpoint determination means notifies the operator by means of an alarm in case the computed equilibrium point setpoint deviates beyond an upper limit value or lower limit value of said equilibrium point setpoint.

Furthermore, the control method of the present invention is characterized in that it comprises: a first control calculation step in which a setpoint and process variable of a primary control system are taken as input and a first manipulated variable is computed through control calculations; a first manipulated variable output step in which the first manipulated variable computed in the first control calculation step is output to an actuator of said primary control system; a second control calculation step in which an equilibrium point setpoint representing an equilibrium point which is the desired manipulated variable output in steady state of primary control is taken as input, the first manipulated variable computed in said first control calculation step is taken as process variable input, and a second manipulated variable is computed through control calculations; a second manipulated variable output step in which the second manipulated variable computed in the second control calculation step is output to an actuator of a secondary control system for adjusting said equilibrium point; a steady state detection step in which the state in which the setpoint of said primary control system is maintained at the same value for a pre-specified period of time or longer is detected as a steady state; an equilibrium point setpoint determination step in which said equilibrium point setpoint is computed based on the difference between the mean value and minimum value of said first manipulated variable detected in said steady state or the difference between said mean value and the maximum value of said first manipulated variable; and an equilibrium point setpoint output step in which the equilibrium point setpoint computed in the equilibrium point setpoint determination step is set as a value to be used in said second control calculation step.

Effect of the Invention

According to the present invention, by providing a first control calculation means of a primary control system, a first manipulated variable output means of the primary control system, a second control calculation means of a secondary control system, a second manipulated variable output means of the secondary control system, a steady state detection means which detects a state in which a setpoint of the primary control system is maintained at the same value for a pre-specified period of time or longer as a steady state, an equilibrium point setpoint determination means which computes an equilibrium point setpoint based on the difference between the mean value and minimum value of the first manipulated variable or the difference between the maximum value and mean value of the first manipulated variable detected in the steady state, and an equilibrium point setpoint output means which sets the equilibrium point setpoint as a value to be used by the second control calculation means, it becomes possible to implement energy conservation by determining the equilibrium point setpoint by a more objective method than in the prior art.

Furthermore, with the present invention, energy conservation can be implemented by determining the equilibrium point setpoint by a substantially more objective method than in the prior art by performing upper/lower limit processing which constrains the computed equilibrium point setpoint to a range between a predetermined upper limit value and lower limit value and then setting it as the value to be used by the second control calculation means.

Furthermore, with the present invention, by computing the equilibrium point setpoint by adding, to the lower limit value of the first manipulated variable, a value obtained by including a margin in the difference between the mean value and minimum value of the first manipulated variable detected in the steady state, it becomes possible to set the equilibrium point setpoint so as to minimize the margin between it and the lower limit value of the first manipulated variable, allowing one to determine an equilibrium point setpoint well suited for objects of control which can be maintained in a state advantageous for energy conservation the smaller the first manipulated variable.

Furthermore, with the present invention, by computing the equilibrium point setpoint by subtracting, from the upper limit value of the first manipulated variable, a value obtained by including a margin in the difference between the mean value and maximum value of the first manipulated variable detected in the steady state, it becomes possible to set the equilibrium point setpoint so as to minimize the margin between the first manipulated variable and the upper limit value, allowing one to determine an equilibrium point setpoint well suited for objects of control which can be maintained in a state advantageous for energy conservation the larger the first manipulated variable.

Furthermore, with the present invention, by notifying the operator by means of an alarm in case the equilibrium point setpoint computed by the equilibrium point setpoint determination means has deviated beyond the upper limit value or lower limit value of the equilibrium point setpoint, it is possible to inform the operation of the possibility that inappropriate automatic determination of the equilibrium point setpoint has taken place.

DESCRIPTION OF THE EMBODIMENTS

Principles of the Invention 1

Equilibrium point setpoint basically signifies a method of selecting a manipulated variable in order to minimize mutual cancellation of outputs and implement energy conservation. Here, control equilibrium state refers to a steady state from the standpoint of control operation, being a state in which the setpoint (SP_A in FIG. 7) of the primary purpose control system is maintained at the same value over a long period of time. Therefore, the inventors conceived that if the equilibrium point setpoint was back-calculated so that the margin between the manipulated variable MV_A and the upper/lower limit required in the steady state would be minimized, based on the actual results for the manipulated variable MV_A in steady state, it would be possible to determine an equilibrium point setpoint which was objectively and in principle appropriate.

Figure 7:
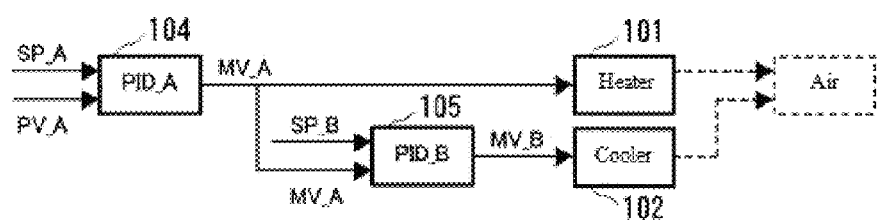
FIG. 7 is a block diagram illustrating the configuration of a conventional control device.

For example, for mitigation of the mutual cancellation of heating and cooling outputs as disclosed in Patent Literature 1, it would suffice to detect the steady state in which setpoint SP_A of FIG. 7 is maintained at the same value for a specified period of time or longer, and back-calculate an equilibrium point setpoint SP_B based on the difference between the mean value MV_A_ave and minimum value MV_A_min of the manipulated variable MV_A detected in this steady state. The theoretical equilibrium point setpoint SP_B which minimizes the cancellation of outputs without sacrificing control performance can be taken to be a value which minimizes the margin between the manipulated variable MV_A and the lower limit value OL_A (normally 0.0%), and can be computed by the following formula.

$$SP\_B = OL\_A + (MV\_A\_ave - MV\_A\_min) \quad (1)$$

In the description of formula (1) and subsequent formulas, it will be assumed that process variable PV_A, setpoints SP_A and SP_B and manipulated variables MV_A and MV_B have all been normalized to 0-100%.

While no margin has been provided in the computation of equilibrium point setpoint SP_B in formula (1), in practice, it is preferable to have a control system design specialist with greater knowledge than an on-site operator specify the manner of providing a margin in advance in accordance with the characteristics of the object of control. A practical equilibrium point setpoint SP_B would be, for example, as in the following formulas.

$$SP\_B = OL\_A + (MV\_A\_ave - MV\_A\_min) \times \alpha \quad (2)$$

$$SP\_B = OL\_A + (MV\_A\_ave - MV\_A\_min + \beta) \quad (3)$$

In formula (2), $\alpha$ is a coefficient which determines the margin, being for example a value of about 0.8 to 1.2, centered on 1.0. Similarly, $\beta$ in formula (3) is also a coefficient which determines the margin, being for example a value of about −5.0% to 5.0%, centered on 0.0. Here, the coefficients $\alpha$ and $\beta$ which determine the margin are in principle determined subjectively. However, since they are not elements which directly determine the equilibrium point setpoint SP_B, it is possible to reduce the variable range of the coefficients $\alpha$ and $\beta$ (for example, $\alpha$ can be fixed at 1.0 and $\beta$ can be fixed at 0.0). If the variable range is reduced in this way, the objectivity of the equilibrium point setpoint SP_B can be maintained to a significantly greater extent than in prior art Patent Literature 1.

The same sort of design can be employed in cases where the equilibrium point setpoint SP_B is to be determined using the margin between the manipulated variable MV_A and the upper limit value OH_A. In this case, the equilibrium point setpoint SP_B can be back-calculated as per the following formulas based on the difference between the average value MV_A_ave and the maximum value MV_A_max of the manipulated variable MV_A detected in steady state.

$$SP\_B = OH\_A - (MV\_A\_max - MV\_A\_ave) \times \alpha \quad (4)$$

$$SP\_B = OH\_A - (MV\_A\_max - MV\_A\_ave + \beta) \quad (5)$$

Coefficient $\alpha$ of formula (4) is for example a value of about 0.8 to 1.2, centered on 1.0, and coefficient $\beta$ of formula (5) is for example a value of about −5.0% to 5.0%, centered on 0.0.

Principle of the Invention 2

The present invention is an automatic determination technique for equilibrium point setpoint SP_B based on actual results of control, and thus needs to take into consideration the risk of inappropriate automatic determination of equilibrium point setpoint SP_B being carried out based on highly specific control state results. To address this risk, upper and lower limit values should be set in advance by a control system design specialist for the equilibrium point setpoint SP_B itself. In case the automatically determined equilibrium point setpoint SP_B should reach the upper or lower limit value, it is preferable to notify the operator by means of an alarm or the like.

Just as with the coefficients α and β, the upper and lower limit values of equilibrium point setpoint SP_B are in principle determined subjectively. However, since they are not elements which directly determine the equilibrium point setpoint SP_B, it is also possible to increase the range of the upper and lower limit values. If the range of the upper and lower limit values is increased, it will be possible to secure a larger range over which the equilibrium point setpoint SP_B can be automatically determined, thus making it possible to maintain significantly greater objectivity of the equilibrium point setpoint SP_B as compared to prior art Patent Literature 1.

Embodiment

Figure 1:
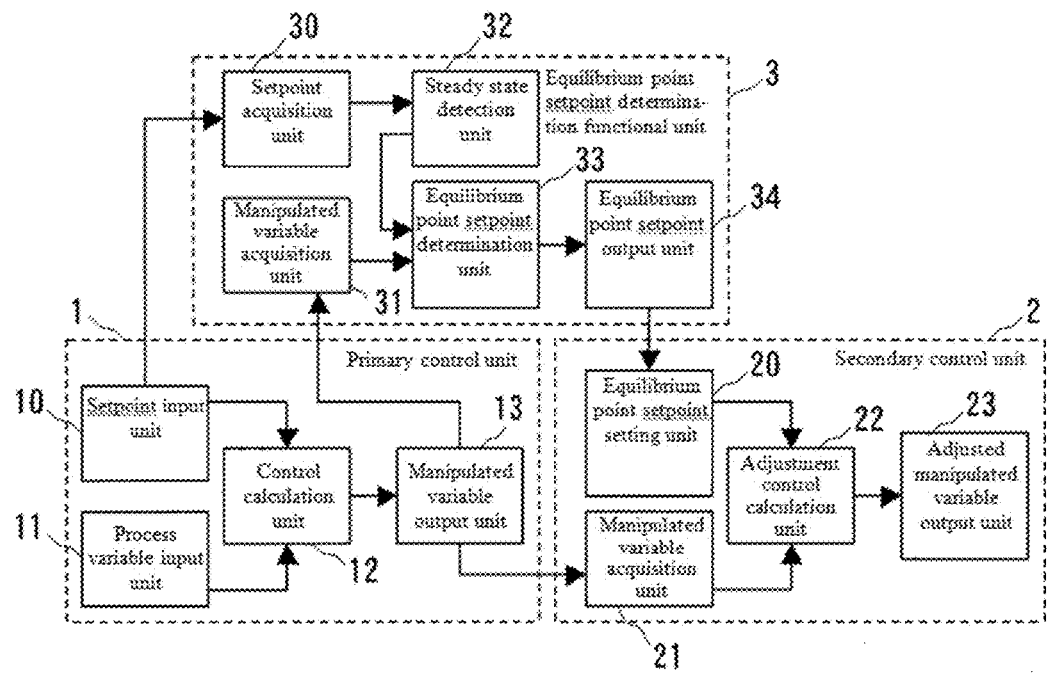
FIG. 1 is a block diagram illustrating the configuration of a control device according to an embodiment of the present invention.
Figure 2:
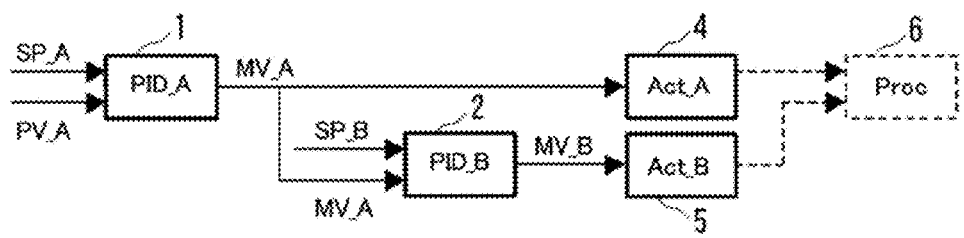
FIG. 2 is a block diagram of a control system according to an embodiment of the present invention.

An embodiment of the present invention will be described with reference to the drawings. FIG. 1 is a block diagram illustrating the configuration of a control device according to the present embodiment, and FIG. 2 is a block diagram of the control system according to the present embodiment. The present embodiment is an example corresponding to the above-described principle of the invention 1 and principle of the invention 2. Furthermore, the object of application in the present embodiment is a heating-cooling mutual cancellation system as described in FIG. 6 and FIG. 7 (a system in which a state more advantageous for energy conservation can be maintained the smaller the manipulated variable MV_A). Namely, this is a case in which the equilibrium point setpoint SP_B should be determined based on the margin between the manipulated variable MV_A and the lower limit value OL_A.

The control device comprises a primary control unit 1 provided in correspondence with a primary control system for the primary purpose of control; a secondary control unit 2 provided in correspondence with a secondary control system (manipulated variable adjustment control system) for adjusting the equilibrium point, which is the desired manipulated variable output in a steady state of primary control; and an equilibrium point setpoint determination functional unit 3 which determines the equilibrium point setpoint SP_B representing the equilibrium point and updates the equilibrium point setpoint SP_B used by the secondary control unit 2.

The primary control unit 1 comprises a setpoint input unit 10 for inputting the setpoint SP_A of the primary control system; a process variable input unit 11 for inputting process variable PV_A of the primary control system which is measured by a measurement instrument; a control calculation unit 12 (first control calculation means) which computes the manipulated variable MV_A (first manipulated variable) through feedback control calculations using setpoint SP_A and process variable PV_A as input; and manipulated variable output unit 13 (first manipulated variable output means) which outputs the manipulated variable MV_A to an actuator of the primary control system.

The secondary control unit 2 comprises an equilibrium point setpoint setting unit 20 for inputting an equilibrium point setpoint SP_B; a manipulated variable acquisition unit 21 which acquires the manipulated variable MV_A from the primary control unit 1; an adjustment control calculation unit 22 (second control calculation means) which takes the equilibrium point setpoint SP_B as input, uses manipulated variable MV_A as process variable input, and computes an adjusted manipulated variable MV_B (second manipulated variable) through feedback control calculations; and an adjusted manipulated variable output unit 23 (second manipulated variable output means) which outputs the adjusted manipulated variable MV_B to an actuator of the secondary control system.

The equilibrium point setpoint determination functional unit 3 comprises a setpoint acquisition unit 30 which acquires the setpoint SP_A from primary control unit 1; a manipulated variable acquisition unit 31 which acquires the manipulated variable MV_A from the primary control unit 1; a steady state detection unit 32 which detects a state in which the setpoint SP_A is maintained at the same value for a pre-specified period of time or longer as a steady state; an equilibrium point setpoint determination unit 33 which computes an equilibrium point setpoint SP_B based on the difference between the average value MV_A_ave and minimum value MV_A_min of the manipulated variable MV_A detected in steady state; and an equilibrium point setpoint output unit 34 which outputs the equilibrium point setpoint SP_B to the equilibrium point setpoint setting unit 20 and updates the equilibrium point setpoint SP_B used by the secondary control unit 2.

In FIG. 2, 4 is an actuator of the primary control system (heater 101 in the example of FIG. 6 and FIG. 7), 5 is an actuator of the secondary control system (cooler 102 in the example of FIG. 6 and FIG. 7), and 6 is the object of control. The primary control unit 1, actuator 4 and object of control 6 make up the primary control system, while the secondary control unit 2, actuator 5 and object of control 6 make up the secondary control system.

Figure 3:
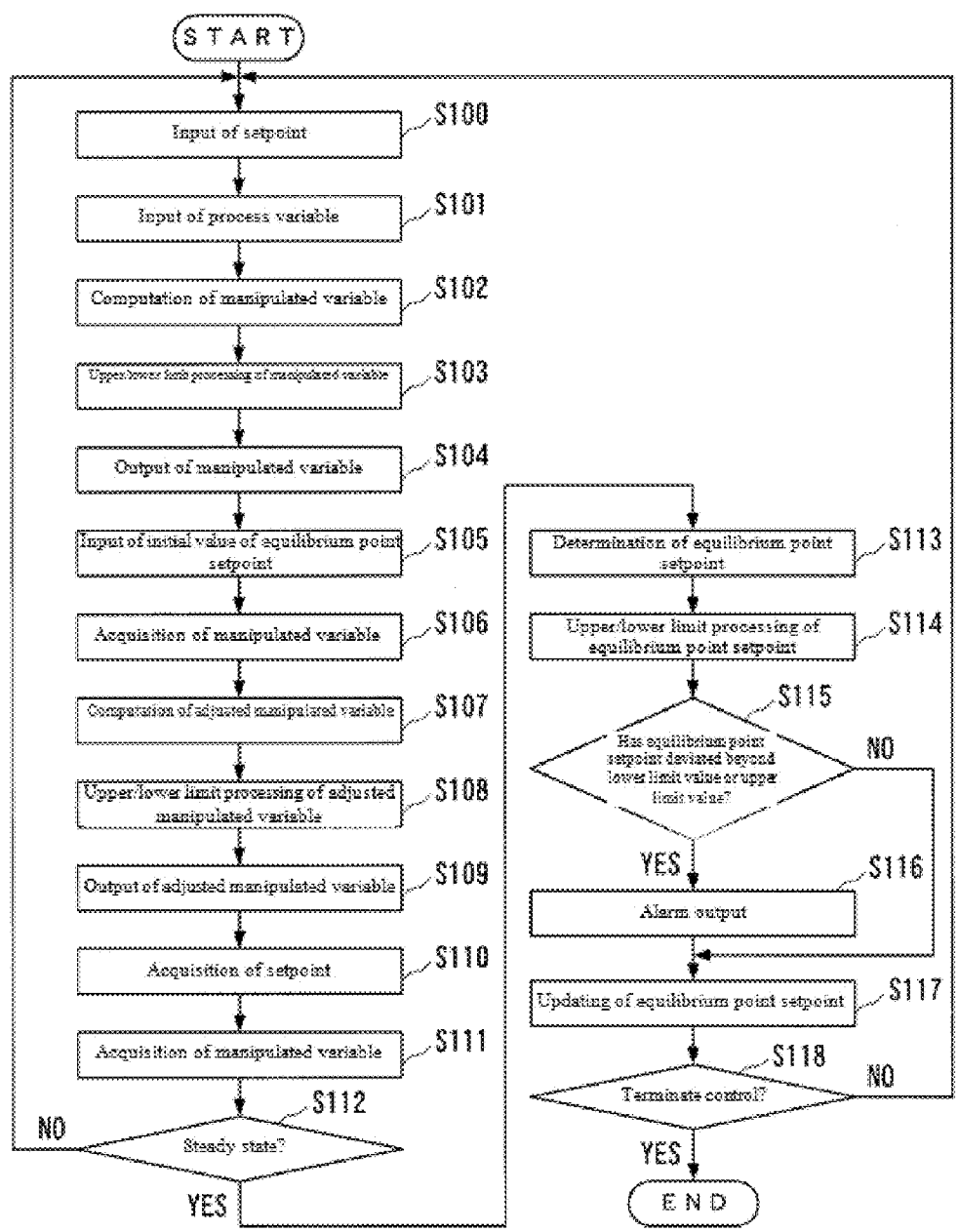
FIG. 3 is a flowchart illustrating the operation of a control device according to an embodiment of the present invention.

The operation of the control device of the present embodiment will be described below with reference to FIG. 3. FIG. 3 is a flowchart illustrating the operation of the control device.

The setpoint SP_A of the primary control system is set by an operator or the like, and is input via setpoint input unit 10 into control calculation unit 12 and setpoint acquisition unit 30 of equilibrium point setpoint determination functional unit 3 (FIG. 3, step S100).

The process variable PV_A of the primary control system is measured by means of a sensor or the like (temperature sensor 103 in the example of FIG. 6), and is input via process variable input unit 11 into control calculation unit 12 and manipulated variable acquisition unit 31 of equilibrium point setpoint determination functional unit 3 (FIG. 3, step S101).

Control calculation unit 12 of primary control unit 1 computes the manipulated variable MV_A by performing PID control calculations as in the following transfer function formula based on the setpoint SP_A input from setpoint input unit 10 and the process variable PV_A input from process variable input unit 11 (FIG. 3, step S102).

$$MV\_A=(100/PB\_A)\{1+/TI\_As)+TD\_As\}\times(SP\_A-PV\_A) \quad (6)$$

In formula (6), PB_A is the proportional band, TI_A is integral time, TD_A is derivative time and s is a Laplace operator.

The control calculation unit 12 then performs upper limit processing as per formula (7) and at the same time performs lower limit processing as per formula (8) on the computed manipulated variable MV_A (FIG. 3, step S103).

$$\text{IF } MV\_A>OH\_A \text{ THEN } MV\_A=OH\_A \quad (7)$$

$$\text{IF } MV\_A<OL\_A \text{ THEN } MV\_A=OL\_A \quad (8)$$

Namely, if the manipulated variable MV_A is greater than a preset upper limit value OH_A, the control calculation unit 12 makes manipulated variable MV_A=OH_A, and if manipulated variable MV_A is less than a preset lower limit value OL_A, it makes manipulated variable MV_A=OL_A. Normally, the upper limit value OH_A is 100.0% and the lower limit value OL_A is 0.0%.

The manipulated variable output unit 13 of primary control unit 1 outputs the manipulated variable MV_A which has been computed and subjected to lower/upper limit processing by control calculation unit 12 to actuator 4 of the primary control system (FIG. 3, step S104).

Next, the initial value of equilibrium point setpoint SP_B, representing the equilibrium point of manipulated variable MV_A which is to be adjusted, is set by the operator, etc., and is input via equilibrium point setpoint setting unit 20 of secondary control unit 2 into adjustment control calculation unit 22 (FIG. 3, step S105). The initial value of equilibrium point setpoint SP_B is determined in consideration of the energy efficiency, etc.

The manipulated variable acquisition unit 21 of secondary control unit 2 acquires manipulated variable MV_A from manipulated variable output unit 13 of primary control unit 1 (FIG. 3, step S106). The adjustment control calculation unit 22 of secondary control unit 2 computes the adjusted manipulated variable MV_B by performing PID control calculations as per the following transfer function formula based on the equilibrium point setpoint SP_B input from equilibrium point setpoint setting unit 20 and the manipulated variable MV_A input from manipulated variable acquisition unit 21 (FIG. 3, step S107).

$$MV\_B=(100/PB\_B)\{1+/TI\_Bs)+TD\_Bs\}\times(SP\_B-MV\_A) \quad (9)$$

In formula (9), PB_B is the proportional band, TI_B is integral time, TD_B is derivative time and s a Laplace operator.

The adjustment control calculation unit 22 then performs upper limit processing as per formula (10) and at the same time performs lower limit processing as per formula (11) on the computed adjusted manipulated variable MV_B (FIG. 3, step S108).

$$\text{IF } MV\_B>OH\_B \text{ THEN } MV\_B=OH\_B \quad (10)$$

$$\text{IF } MV\_B<OL\_B \text{ THEN } MV\_B=OL\_B \quad (11)$$

Namely, if the adjusted manipulated variable MV_B is greater than a preset upper limit value OH_B, the adjustment control calculation unit 22 makes manipulated variable MV_B=OH_B, and if adjusted manipulated variable MV_B is less than a preset lower limit value OL_B, it makes manipulated variable MV_B=OL_B. Normally, the upper limit value OH_B is 100.0% and the lower limit value OL_B is 0.0%.

The adjusted manipulated variable output unit 23 of secondary control unit 2 outputs the adjusted manipulated variable MV_B which has been computed and subjected to upper/lower limit processing by adjustment control calculation unit 22 to the corresponding actuator 5 of the secondary control system (FIG. 3, step S109).

Next, setpoint acquisition unit 30 of equilibrium point setpoint determination functional unit 3 acquires setpoint SP_A from setpoint input unit 10 of primary control unit 1 (FIG. 3, step S110).

Manipulated variable acquisition unit 31 of equilibrium point setpoint determination functional unit 3 acquires manipulated variable MV_A from manipulated variable output unit 13 of primary control unit 1 (FIG. 3, step S111).

Steady state detection unit 32 of equilibrium point setpoint determination functional unit 3 determines if primary control is in a steady state (FIG. 3, step S112). Specifically, the steady state detection unit 32 determines primary control to be in a steady state if setpoint SP_A has been maintained at the same value for a predetermined period TH or greater up to the current control cycle time point from a past time point preceding the current control cycle time point at which the determination is to be made. The time period TH can be pre-specified as a time period equal to or greater than the time period necessary for completion of the transition state whereby the process variable PV_A comes to follow the setpoint SP_A when the setpoint SP_A has been modified.

When primary control has been determined to be in steady state (YES in step S112), equilibrium point setpoint determination unit 33 of equilibrium point setpoint determination functional unit 3 determines the equilibrium point setpoint SP_B by the above formula (2) based on the average value MV_A_ave of manipulated variable MV_A detected in steady state and the minimum value MV_A_min of manipulated variable MV_A detected in steady state (FIG. 3, step S113). As indicated above, coefficient α is for example a value of about 0.8 to 1.2, centered on 1.0. The steady state range over which the average value MV_A_ave and minimum value MV_A_min are determined is the entire time band in which steady state has been continually detected from the past until the current control cycle time point.

The equilibrium point setpoint determination unit 33 performs upper limit processing as per formula (12) and at the same time performs lower limit processing as per formula (13) on the equilibrium point setpoint SP_B computed in step S113 (FIG. 3, step S114).

$$\text{IF } SP\_B>SH \text{ THEN } SP\_B=SH \quad (12)$$

$$\text{IF } SP\_B<SL \text{ THEN } SP\_B=SL \quad (13)$$

Namely, when equilibrium point setpoint SP_B is greater than preset upper limit value SH, the equilibrium point setpoint determination unit 33 makes equilibrium point setpoint SP_B=SH, and when equilibrium point setpoint SP_B is less that a preset lower limit value SL, it makes equilibrium point setpoint SP_B=SL.

If there are no special restrictions, the upper limit value SH of equilibrium point setpoint SP_B can be the same value as the upper limit value OH_A of manipulated variable MV_A and the lower limit value SL of equilibrium point setpoint SP_B can be the same value as the lower limit value OL_A of manipulated variable MV_A. However, considering the technical meaning, the setting should be made so that SH<OH_A.

Furthermore, if the equilibrium point setpoint SP_B computed in step S113 has deviated beyond the upper limit value SH or lower limit value SL, i.e. if the equilibrium point setpoint SP_B is greater than upper limit value SH or less than lower limit value SL (FIG. 3, step S115), the equilibrium point setpoint determination unit 33 outputs an alarm to the operator indicating that inappropriate automatic determination of equilibrium point setpoint SP_B may have occurred (FIG. 3, step S116). Alarm output methods include, for example, the method of flashing or illuminating an alarm notification LED provided on the control device.

The equilibrium point setpoint output unit 34 of equilibrium point setpoint determination functional unit 3 updates the equilibrium point setpoint SP_B used by secondary control unit 2 by outputting the equilibrium point setpoint SP_B which has been computed and subjected to upper/lower limit processing by equilibrium point setpoint determination unit 33 to equilibrium point setpoint setting unit 20 of secondary control unit 2 (FIG. 3, step S117).

The processing of S100 to S117 as described above is repeatedly executed in every control cycle until control is terminated, for example by an instruction from the operator (YES in FIG. 3, step S118).

Figure 4:
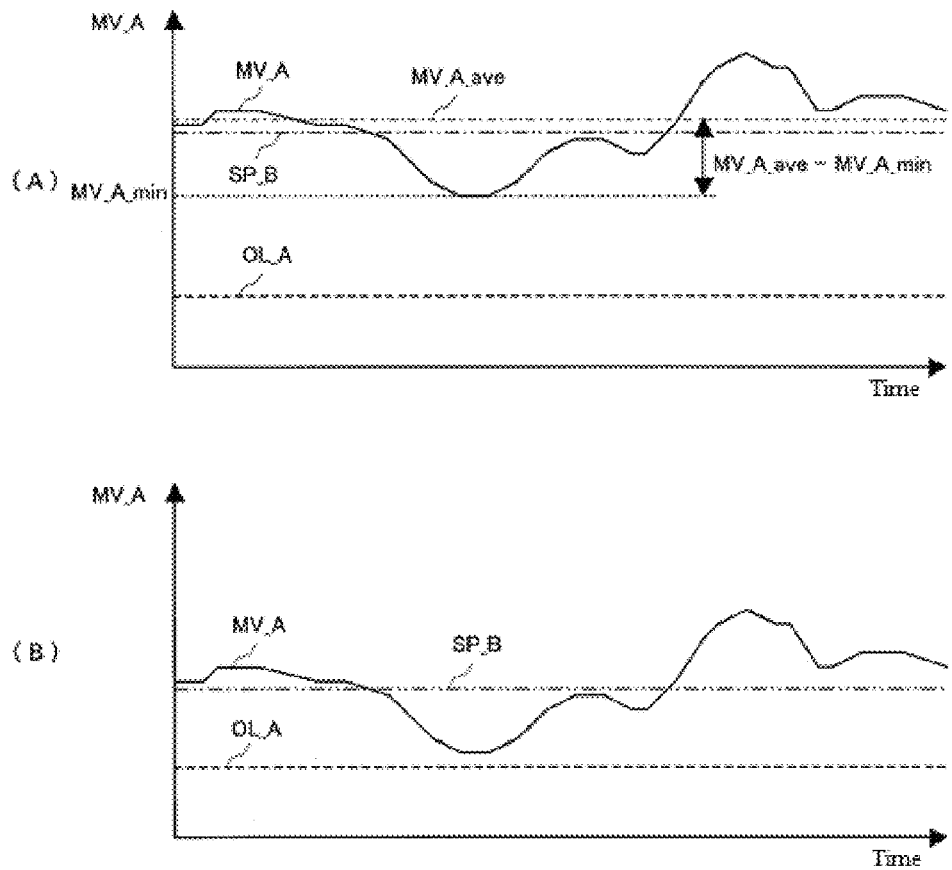
FIG. 4A and FIG. 4B are drawings illustrating examples of the operation of a control device according to an embodiment of the present invention.

FIG. 4 (A) and FIG. 4 (B) are drawings illustrating an example of the operation of the control device of the present embodiment, FIG. 4 (A) being a drawing illustrating an example of operation before adjustment of equilibrium point setpoint SP_B and FIG. 4 (B) being a drawing illustrating an example of operation after adjustment of the equilibrium point setpoint SP_B. The vertical axis in FIG. 4 (A) and FIG. 4 (B) is the manipulated variable and the horizontal axis is time. According to the present embodiment, by computing and updating the equilibrium point setpoint SP_B as described above in the steady state shown in FIG. 4 (A), the equilibrium point setpoint SP_B can be set so as to minimize the margin between the manipulated variable MV_A and the lower limit value OL_A, as shown in FIG. 4 (B).

It will be noted that in the present embodiment, formula (2) was used as the formula by which the equilibrium point setpoint determination unit 33 determines the equilibrium point setpoint SP_B, but the equilibrium point setpoint SP_B may also be determined according to formula (3), as explained under principle of the invention 1 above.

Figure 6:
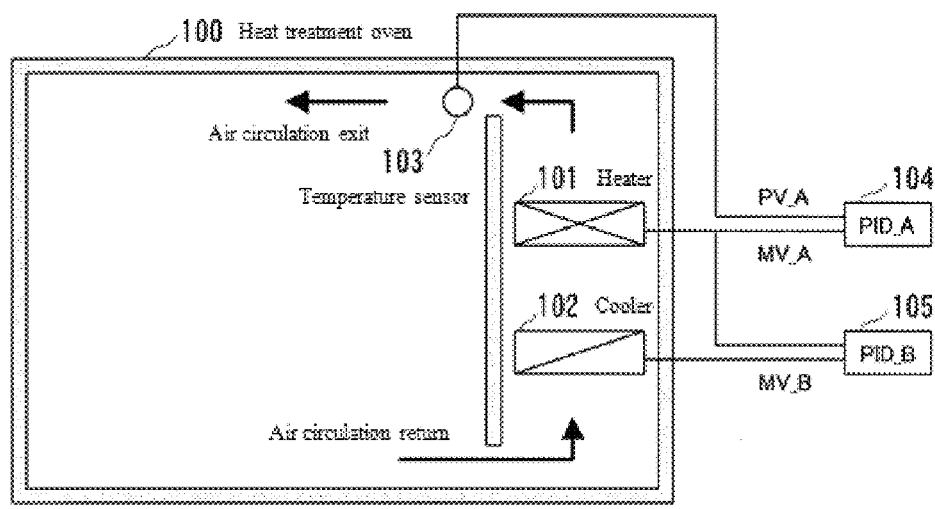
FIG. 6 is a drawing illustrating an example in which a conventional control device is applied to temperature control of a heat treatment oven.

Furthermore, in the present embodiment, the object of application was a heating and cooling system as illustrated in FIG. 6 and FIG. 7, but, for example, a system in which the manipulated variable MV_A of the primary control system manipulates the flow rate of heat exchange medium and manipulated variable MV_B of the secondary control system manipulates the temperature of the heat exchange medium is also included within the object of application of the present invention.

Figure 5:
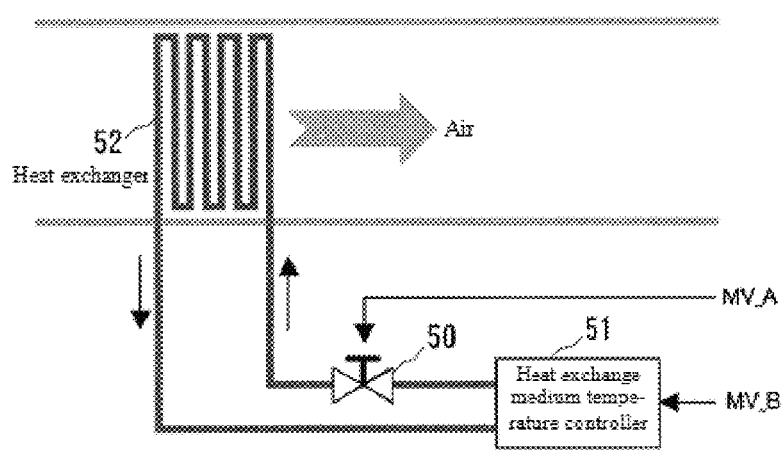
FIG. 5 is a drawing illustrating the configuration of a temperature control system based on heat exchange medium flow rate.

A configuration of this sort of temperature control system is shown in FIG. 5. In the example of FIG. 5, the degree of opening of heat exchange medium flow rate control valve 50 is controlled according to the manipulated variable MV_A, and the temperature of the heat exchange medium supplied from heat exchange medium temperature controller 51 is controlled according to adjusted manipulated variable MV_B. Heat exchange medium which has passed through heat exchange medium flow rate control valve 50 is supplied to heat exchanger 52, and heat exchange medium which has passed through the heat exchanger 52 returns to heat exchange medium temperature controller 51. In this way, air is heated or cooled by the heat exchanger 52.

Here, if the temperature of the heat exchange medium can be maintained in a state more advantageous in terms of energy conservation the larger the flow rate (primary control system manipulated variable MV_A) of heat exchange medium, then it would be a case where the equilibrium point setpoint SP_B should be determined based on the margin between the manipulated variable MV_A and the upper limit value OH_A. In this case, the equilibrium point setpoint determination unit 33 determines the equilibrium point setpoint SP_B according to formula (4) or formula (5), as described under principle of invention 1 above. Furthermore, settings should be made so that SL>OL_A.

The control device described in the present embodiment can be implemented by means of a computer comprising a CPU (Central Processing Unit), storage device and interface, and a program which controls these hardware resources. The CPU executes the processing described in the present embodiment in accordance with a program stored in the storage device.

FIELD OF INDUSTRIAL APPLICABILITY

The present invention can be applied to technology for implementing energy conservation in control systems having a configuration wherein a secondary control system for adjusting an equilibrium point is added to a primary control system.

DESCRIPTION OF REFERENCE SYMBOLS

1 . . . primary control unit;
2 . . . secondary control unit;
3 . . . equilibrium point setpoint determination functional unit;
10 . . . setpoint input unit;
11 . . . process variable input unit;
12 . . . control calculation unit;
13 . . . manipulated variable output unit;
20 . . . equilibrium point setpoint setting unit;
21, 31 . . . manipulated variable acquisition unit;
22 . . . adjustment control calculation unit;
23 . . . adjusted manipulated variable output unit;
30 . . . setpoint acquisition unit;
32 . . . steady state detection unit;
33 . . . equilibrium point setpoint determination unit;
34 . . . equilibrium point setpoint output unit.

The invention claimed is:

1. A control device comprising:
one or more storage devices; and
one or more processors coupled to the one or more storage devices that execute instructions stored in the one or more storage devices to embody:
 a first control calculation unit in correspondence with a primary control system, the first control calculation unit receiving a setpoint and a process variable of the primary control system as input to determine a first manipulated variable through control calculations;
 a first manipulated variable output unit that outputs the first manipulated variable determined by the first control calculation unit to an actuator of the primary control system for controlling an output corresponding to the actuator of the primary control system;
 a second control calculation unit in correspondence with a secondary control system for adjusting an equilibrium point, wherein the equilibrium point is a desired manipulated variable output in a steady state of primary control, the second control calculation unit taking an equilibrium point setpoint representing the equilibrium point as input, the second control calculation unit taking the first manipulated variable determined by the first control calculation unit as a process variable input to determine a second manipulated variable through control calculations;
 a second manipulated variable output unit that outputs the second manipulated variable determined by the second control calculation unit to an actuator of the secondary control system for controlling an output corresponding to the actuator of the secondary control system;
 a steady state detection unit that detects, as steady state, a state in which the setpoint of the primary control system is maintained at a same value for a prespecified period of time or longer;

an equilibrium point setpoint determination unit that determines the equilibrium point setpoint based on a difference between an average value and a minimum value of the first manipulated variable or a difference between the average value and a maximum value of the first manipulated variable detected in the steady state; and an equilibrium point setpoint output unit that sets the equilibrium point setpoint determined by the equilibrium point setpoint determination unit as the input to the second control calculation unit.

2. The control device of claim 1, wherein the equilibrium point setpoint determination unit is configured to perform upper/lower limit processing to constrain the determined equilibrium point setpoint to within a range between a predetermined upper limit value and a predetermined lower limit value and is configured to output an equilibrium point setpoint which has been subjected to upper/lower limit processing to the equilibrium point setpoint output unit; and
wherein the upper limit value of the equilibrium point setpoint is set to be smaller than a predetermined upper limit value of the first manipulated variable and the lower limit value of the equilibrium point setpoint is set to be greater than a predetermined lower limit value of the first manipulated variable.

3. The control device of claim 2, wherein an object of control manipulated by the primary control system and the secondary control system can be maintained in a state more advantageous for energy conservation the smaller the first manipulated variable is; and
the equilibrium point setpoint determination unit is configured to determine the equilibrium point setpoint by adding, to the lower limit value of the first manipulated variable, a value obtained by including a margin in the difference between the average value and minimum value of the first manipulated variable detected in steady state.

4. The control device of claim 2 wherein an object of control manipulated by the primary control system and the secondary control system can be maintained in a state more advantageous for energy conservation the greater said first manipulated variable is; and
the equilibrium point setpoint determination unit is configured to determine the equilibrium point setpoint by subtracting, from the upper limit value of said first manipulated variable, a value obtained by including a margin in the difference between the average value and the maximum value of the first manipulated variable detected in the steady state.

5. The control device of claim 2, wherein the equilibrium point setpoint determination unit is configured to notify an operator via an alarm in the event that the determined equilibrium point setpoint deviates beyond the upper limit value or lower limit value of the equilibrium point setpoint.

6. A computer-implemented control method, comprising:
calculating, by a first controller, a first manipulated variable based on a setpoint and process variable of a primary control system inputted to the first controller;
outputting, by the first controller, the calculated first manipulated variable to an actuator of the primary control system for controlling the actuator of the primary control system;

calculating, by a second controller, a second manipulated variable based on an equilibrium point setpoint representing an equilibrium point which is a desired manipulated variable output in steady state of primary control, inputted to the second controller and the calculated first manipulated variable from the first controller as a process variable input;
outputting, by the second controller, the calculated second manipulated variable to an actuator of a secondary control system for adjusting the equilibrium point;
detecting, by a processor, a state in which the setpoint of the primary control system is maintained at a constant value for a pre-specified period of time or longer as a steady state;
determining, by the processor, the equilibrium point setpoint based on a difference between an average value and a minimum value of the first manipulated variable or a difference between the average value and a maximum value of the first manipulated variable detected in said steady state; and
outputting, by the processor, the determined equilibrium point setpoint to the second controller.

7. The method of claim 6, wherein the equilibrium point setpoint determining step includes a step in which upper/lower limit processing is performed, which constrains the determined equilibrium point setpoint to a range between a predetermined upper limit value and a lower limit value; and
the upper limit of the equilibrium point setpoint is set to be smaller than a predetermined upper limit value of said first manipulated variable and the lower limit value of said equilibrium point setpoint is set be greater than a predetermined lower limit value of said first manipulated variable.

8. The method of claim 7, wherein an object of control manipulated by the primary control system and the secondary control system can be maintained in a state more advantageous for energy conservation the smaller the first manipulated variable is; and
the equilibrium point setpoint determining step includes a step in which the equilibrium point setpoint is determined by adding, to the lower limit value of the first manipulated variable, a value obtained by including a margin in the difference between the average value and minimum value of the first manipulated variable detected in the steady state.

9. The method of claim 7, wherein an object of control manipulated by the primary control system and the secondary control system can be maintained in a state more advantageous for energy conservation the greater said first manipulated variable is; and
the equilibrium point setpoint determining step includes a step in which the equilibrium point setpoint is determined by subtracting, from the upper limit value of the first manipulated variable, a value obtained by including a margin in the difference between the average value and the maximum value of the first manipulated variable detected in the steady state.

10. The method of claim 7, wherein the equilibrium point setpoint determining step includes a step of notifying an operator via an alarm in the event that the determined equilibrium point setpoint deviates beyond the upper limit value or lower limit value of said equilibrium point setpoint.

* * * * *